United States Patent Office 3,595,830
Patented July 27, 1971

3,595,830
AMINO ORGANOSILANES AS ANTIOZONANTS FOR RUBBERS
William John Owen and Bryan Ewart Cooper, Glamorgan, Wales, assignors to Midland Silicones Limited, Reading, Berkshire, England
No Drawing. Filed July 23, 1969, Ser. No. 844,170
Claims priority, application Great Britain, July 26, 1968, 35,774/68
Int. Cl. C08c *11/66;* C08d *11/04*
U.S. Cl. 260—45.9                                    5 Claims

ABSTRACT OF THE DISCLOSURE

The resistance of a vulcanised organic elastomer to ozone is improved by incorporating certain amino organosilanes into the elastomer-forming composition prior to vulcanisation.

---

This invention relates to a method for improving the resistance to ozone degradation of organic elastomers by incorporating therein amino-substituted organosilanes.

The deterioration in natural and synthetic organic elastomers which occurs in the presence of ozone is a well-known phenomenon. Such deterioration is thought to result from the reaction of the ozone with the unsaturated chemical linkages in the polymer and reveals itself as fine cracks on the elastomer surface. Attempts have been made to increase the ozone resistance of organic elastomers by incorporating therein certain additives, the more successful of such additives being organic amines. Although successful in improving ozone resistance these amines have the disadvantage of causing discolouration of the elastomer.

We have now found that certain amino-organosilanes are effective in increasing the resistance of elastomers to the deleterious effects of ozone. We have also found that the said amino-organosilanes are effective in relatively smaller proportions than the known organic amine antiozonants and have the further advantages that they give rise to less discolouration of the elastomer and do not interfere with the vulcanisation thereof. Discolouration of the elastomer under U.V. light is also reduced.

Accordingly this invention provides a method for improving the resistance to ozone of a vulcanised organic elastomer which comprises incorporating into the elastomer-forming composition prior to vulcanisation an organosilane containing at least one silicon-bonded group of the general formula

—CR′$_2$NXY wherein each R′ represents an alkyl radical, an aryl radical or a hydrogen atom, X represents an aryl, alkaryl, alkoxyaryl, silylmethylaryl or aminoaryl radical and Y represents a hydrogen atom or an alkyl, aryl, aralkyl, alkaryl, alkoxyalkyl, alkoxyaryl, aminoalkyl or aminoaryl radical.

This invention also includes an elastomer-forming composition comprising a vulcanisable organic polymer and an amino-organosilane as specified hereinabove.

The organosilanes employed according to this invention may be any of those containing at least one aminosilicon group of the formula

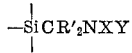

Preferred are the organosilanes of the general formula

R$_n$Si[CH$_2$NXY]$_{4-n}$ wherein each R represents a monovalent hydrocarbon radical or a monovalent hydrocarbonoxy radical, $n$ is 0, 1, 2 or 3, X represents an aryl, alkaryl, alkoxyaryl, silyl-methylaryl or aminoaryl radical and Y represents a hydrogen atom or an alkyl, aryl, aralkyl, alkaryl, alkoxyalkyl, alkoxyaryl, aminoalkyl or aminoaryl radical.

Illustrative of the X radicals are phenyl, naphthyl, tolyl, dimethylphenyl, methoxyphenyl, trialkylsilyltolyl e.g.

aminophenyl and aminomethylphenyl. Illustrative of the organic radicals represented by Y are methyl, ethyl, butyl, decyl, phenyl, naphthyl, tolyl, benzyl, methoxyethyl, ethoxyphenyl, aminopropyl, aminobutyl and aminophenyl.

As the R radicals the organosilane may contain monovalent hydrocarbon radicals, for example alkyl radicals such as methyl, ethyl, propyl, butyl, dodecyl or octadecyl radicals, alkenyl radicals such as vinyl, allyl and cyclohexenyl radicals and aryl radicals such as phenyl and naphthyl radicals. The R radicals may also be selected from monovalent hydrocarbonoxy radicals for example alkoxy and aryloxy radicals such as methoxy, ethoxy, butoxy and phenoxy radicals and alkoxyalkyl and alkoxyaryl radicals such as methoxyethyl, ethoxypropyl and methoxyphenyl wherein the oxygen is present in the form of ether linkages. The preferred organosilanes for use in this invention are those in which R in the general formula is a monovalent hydrocarbon radical, X is an aryl radical, Y is a hydrogen atom and $n$ is 3.

The method of this invention is applicable to the improvement in ozone resistance of any elastomer which is susceptible to deterioration on contact with ozone. The elastomer-forming compositions into which the organosilanes are incorporated may therefore be based on any of those natural or synthetic organic polymers which are vulcanisable to such elastomers. Examples of operative elastomer-forming compositions are those based on natural rubber polymers and synthetic rubber polymers including styrene-butadienes, polyisoprenes, cis-polyisoprenes, butadiene-acrylonitrile copolymers and cis-polybutadienes. The method of this invention is of particular utility in improving the ozone resistance of natural rubber.

The organosilane is incorporated into the elastomer-forming composition prior to vulcanisation. Incorporation may usually be readily achieved, but, if desired, the compatibility of the organosilane with the elastomer-forming composition may be adjusted by suitable choice of the R radicals. The proportion of the organosilane employed is not narrowly critical and improvements in ozone resistance of the elastomer are obtained with proportions as low as 0.25% by weight based on the weight of the elastomer-forming composition. No advantage is seen in employing more than 10% by weight of the organosilane and, for most applications, a proportion lying within the range from 0.5 to 5 percent by weight is preferred.

The following examples in which the parts are expressed parts by weight, illustrate the invention.

EXAMPLE 1

A vulcanisable composition was prepared by compounding on a rubber mill

|  | Parts |
|---|---|
| Heveacrumb SMR 5L[1] | 100 |
| Zinc oxide | 5.0 |
| Stearic acid | 2.0 |
| N-cyclohexylbenzothiazole-2-sulphenamide | 0.5 |
| Sulphur | 2.5 |
| Compound A[2] | 1.0 |

[1] A natural rubber stock in crumb form.
[2] The compound (CH$_3$)$_3$SiCH$_2$NH.C$_6$H$_5$.

The composition was pressed into sheets and vulcanised in a press for 40 minutes at 140° C. Two samples of the sheet were then stretched to 10% and 20% elongations respectively and maintained in this condition for 3 days in an atmosphere containing 25 parts per hundred million of ozone and at a temperature of 30° C. At the end of this period the samples showed very fine surface cracking.

Control samples containing respectively no anti-ozonant and 2 parts of a proprietary antiozonant product [4-isopropylamino-diphenylamine] were also prepared, and tested by this procedure. The samples containing no anti-ozonant exhibited cracking to a greater depth than those containing Compound A. The samples containing 2 parts of the proprietary product also showed deeper cracking than those containing Compound A.

No change in vulcanisation rate was observed in comparison with the control samples when measured on a Wallace Shawbury curometer.

When the test was carried out employing 2.0 parts of Compound A similar results were obtained, and the vulcanised sample was found to have suffered less discolouration after ozone exposure than a sample containing 2.0 parts of the proprietary product.

Compound A was found to be equivalent to the proprietary anti-ozonant, but less staining, when the vulcanisates were compared after 3 days on a De Mattia flex cracking tester, operating at 300 cycles per minute in an atmosphere containing 25 parts per hundred million of ozone. Cracks could not be detected with the naked eye at the end of this period in a vulcanisate protected with 1 part of Compound A.

EXAMPLE 2

The procedure of Example 1 was repeated employing in turn 2.0 parts of each of the following organosilanes in place of Compound A.

Compound B

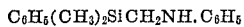

Compound C

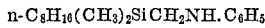

Compound D

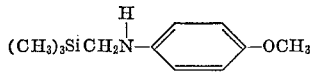

Compound E

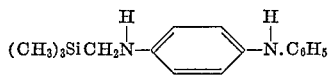

All of Compounds B to E were effective in reducing cracking on exposure of the elastomers to ozone in the De Mattia apparatus.

That which is claimed is:

1. An elastomer-forming composition comprising a vulcanizable organic polymer selected from the group consisting of natural rubber polymers, styrene-butadienes, polyisoprenes, cis-polyisoprenes, butadiene-acrylonitrile copolymers and cis-polybutadienes containing 0.25 to 10 percent by weight based on the weight of the elastomer-forming composition of an organosilane of the general formula $R_nSi[CR'_2NXY]_{4-n}$ where each R represents a monovalent hydrocarbon radical, hydrocarbonoxy radical or hydrocarbonoxyhydrocarbon radical of 1 to 18 carbon atoms, each R' is hydrogen, an alkyl radical or an aryl radical, X is an aryl, alkaryl, alkoxyaryl, silylmethylaryl or aminoaryl radical, Y is a hydrogen atom, an alkyl radical, an aryl radical, an aralkyl radical, alkaryl radical, an alkoxyalkyl radical, an alkoxyaryl radical, an aminoalkyl radical or an aminoaryl radical and $n$ is 0, 1, 2, or 3.

2. The composition of claim 1 wherein the organic polymer is natural rubber.

3. The composition of claim 1 wherein R is a monovalent hydrocarbon radical, X is an aryl radical, Y is a hydrogen atom and $n$ is 3.

4. The composition of claim 1 wherein the organosilane is present in amounts of from 0.5 to 5 percent by weight based on the weight of the elastomer-forming composition.

5. An elastomer-forming composition comprising a vulcanizable diene rubber polymer or copolymer and 0.25 to 10 percent by weight based on the weight of the elastomer-forming composition of an organosilane of the general formula $R_nSi[CR'_2NXY]_{4-n}$ where each R represents a monovalent radical selected from the group consisting of hydrocarbon, hydrocarbonoxy and hydrocarbonoxyhydrocarbon radicals containing 1 to 18 carbon atoms, R' is hydrogen, an alkyl radical or an aryl radical, X is an aryl, alkaryl, alkoxyaryl, silylmethylaryl or aminoaryl radical, Y is a hydrogen atom, alkyl radical, aryl radical, aralkyl radical, alkaryl radical, alkoxyalkyl radical, alkoxyaryl radical, aminoalkyl radical or aminoaryl radical and $n$ is 0, 1, 2 or 3.

References Cited

UNITED STATES PATENTS 2,754,311   7/1956   Elliott _____ 260—448.2
3,432,460   3/1969   Spacht _____ 260—45.9

DONALD E. CZAJA, Primary Examiner

R. A. WHITE, Assistant Examiner

U.S. Cl. X.R.
260—808, 809